(12) United States Patent
Bak et al.

(10) Patent No.: US 9,928,625 B2
(45) Date of Patent: Mar. 27, 2018

(54) VISUALIZING TEMPORAL ASPECTS OF SERIAL PROCESSES

(71) Applicant: International Business Machines Corporation, Armonk, NY (US)

(72) Inventors: Peter Bak, Yokneam Ilit (IL); Gilad M. Saadoun, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/945,810

(22) Filed: Nov. 19, 2015

(65) Prior Publication Data

US 2017/0148195 A1    May 25, 2017

(51) Int. Cl.
  *G06T 11/20* (2006.01)
  *G06K 9/62* (2006.01)

(52) U.S. Cl.
  CPC .......... *G06T 11/206* (2013.01); *G06K 9/6218* (2013.01); *G06T 11/203* (2013.01); *G06K 2209/27* (2013.01)

(58) Field of Classification Search
  CPC .............................. G06T 11/206; G06F 3/0481
  USPC ......................................................... 345/440
  See application file for complete search history.

(56) References Cited

U.S. PATENT DOCUMENTS

| | | | |
|---|---|---|---|
| 8,306,797 B2 | 11/2012 | Furem et al. | |
| 8,887,286 B2 | 11/2014 | Dupont et al. | |
| 8,918,430 B2 | 12/2014 | Fischer | |
| 2005/0222881 A1* | 10/2005 | Booker | G06Q 10/063114 705/7.15 |
| 2006/0058898 A1 | 3/2006 | Emigholz et al. | |
| 2011/0106289 A1 | 5/2011 | Efendic et al. | |
| 2011/0288837 A1 | 11/2011 | Blevins et al. | |

(Continued)

FOREIGN PATENT DOCUMENTS

EP     1866714 B1    3/2010

OTHER PUBLICATIONS

Couchet et al., "A Novel Architecture for the Classification and Visualization of Sequential Data", Adaptive and Natural Computing Algorithms, 8th International Conference, ICANNGA 2007, Warsaw, Poland, Apr. 11-14, 2007, Proceedings, Part I, pp. 1-5, DOI 10.1007/978-3-540-71618-1 81, Springer Berlin Heidelberg, Copyright 2007.

(Continued)

*Primary Examiner* — Jin Ge
(74) *Attorney, Agent, or Firm* — Bryan D. Wells

(57) ABSTRACT

A capability to visualize temporal aspects of serial processes is provided. A process model of a serial process that includes a plurality of events and a plurality of stages is generated. The process model represents each of one or more instances of the serial process as a series of nodes. Each node represents an event and a time at which the event occurred in an instance of the serial process. For each stage of the serial process, a time-coordinate of a first node and a time-coordinate of a second node are altered while maintaining a difference in time between the first and second nodes. A common point lies between the first and second nodes as a result of altering the time-coordinates. A visualization of the process models is presented such that, for each stage of the serial process, a plurality of line segments intersect at the common point.

18 Claims, 10 Drawing Sheets

(56) References Cited

U.S. PATENT DOCUMENTS

| | | | |
|---|---|---|---|
| 2013/0038612 A1* | 2/2013 | Hanumara | G06Q 30/02 345/440 |
| 2013/0152041 A1 | 6/2013 | Hatfield et al. | |
| 2014/0074260 A1 | 3/2014 | Schroeder et al. | |
| 2014/0096249 A1 | 4/2014 | Dupont et al. | |
| 2014/0310226 A1 | 10/2014 | Marianetti, II et al. | |
| 2015/0029193 A1* | 1/2015 | Krajec | G06T 11/203 345/440 |
| 2015/0097840 A1 | 4/2015 | Nishimura et al. | |

OTHER PUBLICATIONS

Nagem et al., "Operational Effectiveness and Predictive Maintenance Analytics Driven by IBM PMQ" (PowerPoint Presentation), IBM Insight2014, The Conference for Big Data and Ananlytics, © 2014 IBM Corporation, pp. 1-46, Grace Period Disclosure.

Rogge-Solti et al., "Temporal Anomaly Detection in Business Processes", This work was partially supported by the European Union's Seventh Framework Programme, (FP7/2007-2013) grant 612052 (SERAMIS), © Springer International Publishing Switzerland 2014, <http://rd.springer.com/chapter/10.1007/978-3-319-10172-9_15>, pp. 234-249.

Bak et al., "Visualization of Serial Processes", U.S. Appl. No. 14/851,513, 34 pages, filed Sep. 11, 2015.

Appendix P, List of IBM Patents or Patent Applications Treated as Related, 2 pages, dates Dec. 1, 2015.

Abdallah, Ali E., "A Graphical Tool for the Visualization and Animation of Communicating Sequential Processes", Department of Computer Science, The University of Reading, Reading, RG6 6AY, UK, 8 pages, printed on Nov. 19, 2015, <http://citeseerx.ist.psu.edu/viewdoc/download?doi=10.1.1.110.5460&rep=rep1&type=pdf>.

Sternberg, Saul, "Sequential Processes and the Shapes of Reaction-Time Distributions", University of Pennsylvania, printed on Sep. 9, 2015, pp. 1-5, <http://www.psych.upenn.edu/~saul/RTshape.invariance.not.pdf>.

\* cited by examiner

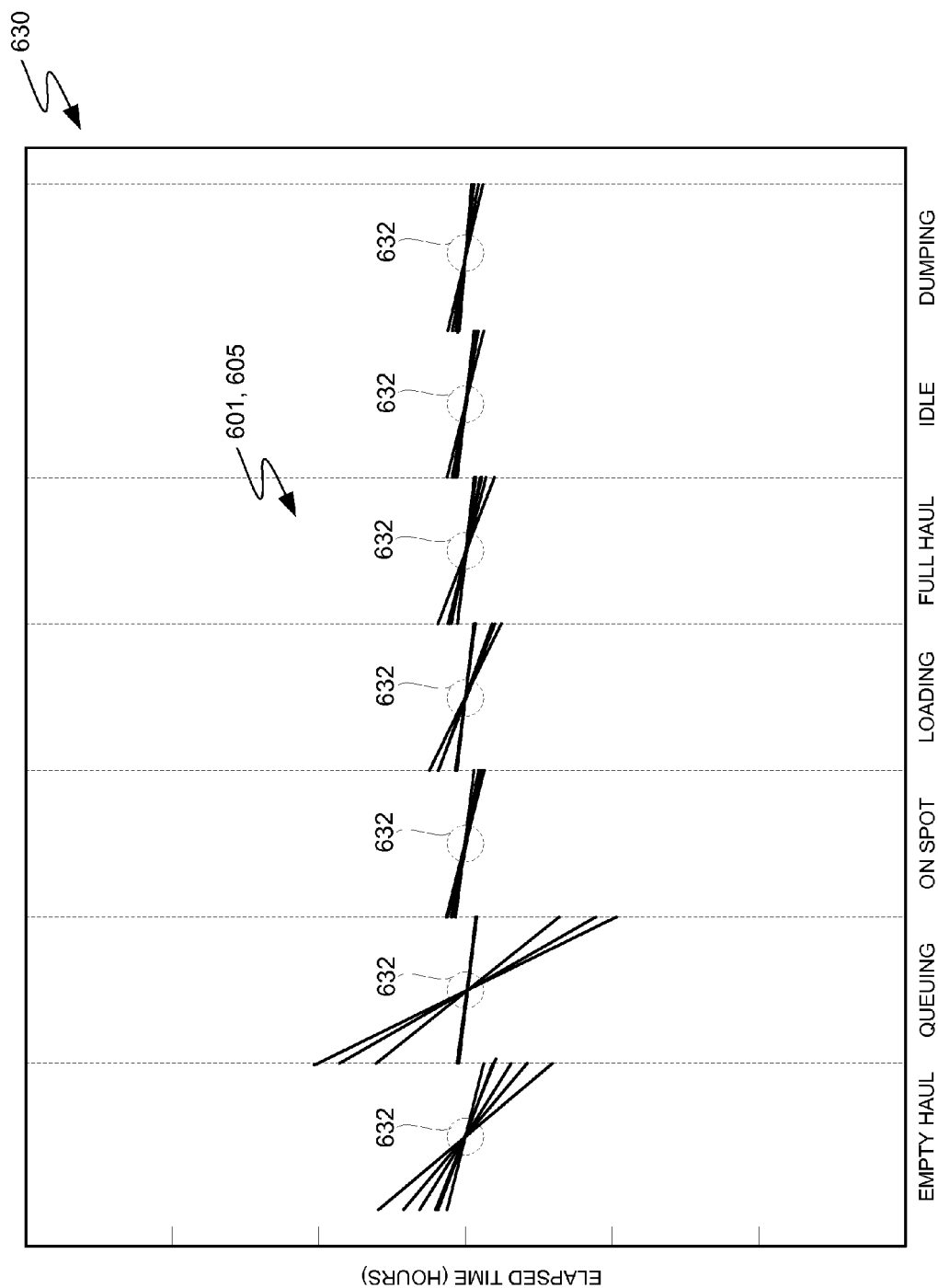

VISUALIZING TEMPORAL ASPECTS OF SERIAL PROCESSES

TECHNICAL FIELD OF THE INVENTION

The present invention relates generally to the field of information visualization, and more particularly to visualizing temporal aspects of serial processes.

BACKGROUND OF THE INVENTION

The field of information visualization has emerged from research in human-computer interaction, computer science, graphics, visual design, psychology, and business methods. It is increasingly applied as a critical component in scientific research, digital libraries, data mining, financial data analysis, market studies, manufacturing production control, and drug discovery.

Information visualization presumes that visual representations and interaction techniques take advantage of the human eye's broad bandwidth pathway into the mind to allow users to see, explore, and understand large amounts of information at once by detecting patterns. Information visualization focused on the creation of approaches for conveying abstract information in intuitive ways.

SUMMARY

According to one embodiment of the present disclosure, a method is provided. The method includes generating, by one or more computer processors, a process model of a serial process, the process model representing each of one or more instances of the serial process as a series of nodes, wherein: the serial process includes a plurality of events; each node is associated with an event of the plurality of events and a time at which the associated event occurred in an instance of the serial process; the serial process includes a plurality of stages; and generating the process model of the serial process comprises: for each stage of the plurality of stages, disassociating, by one or more computer processors, a first node from the time at which the associated event occurred by altering a time-coordinate of the first node; and for each stage of the plurality of stages, disassociating, by one or more computer processors, a second node from the time at which the associated event occurred by altering a time-coordinate of the second node, and wherein: altering the time-coordinate of the first node and altering the time-coordinate of the second node does not alter a difference in time between the time-coordinate of the first node and the time-coordinate of the second node; and a common point lies between the first node and the second node as a result of altering the time-coordinate of the first node and altering the time-coordinate of the second node; and presenting, by one or more computer processors, a visualization of the process model such that, for each stage of the serial process, a plurality of line segments intersect at the common point.

According to another embodiment of the present disclosure, a computer program product is provided. The computer program product comprises a computer readable storage medium and program instructions stored on the computer readable storage medium. The program instructions include program instructions to generate a process model of a serial process, the process model representing each of one or more instances of the serial process as a series of nodes, wherein: the serial process includes a plurality of events; each node is associated with an event of the plurality of events and a time at which the associated event occurred in an instance of the serial process; the serial process includes a plurality of stages; and the program instructions to generate the process model of the serial process comprise: program instructions to, for each stage of the plurality of stages, disassociate a first node from the time at which the associated event occurred by altering a time-coordinate of the first node; and program instructions to, for each stage of the plurality of stages, disassociate a second node from the time at which the associated event occurred by altering a time-coordinate of the second node, and wherein: altering the time-coordinate of the first node and altering the time-coordinate of the second node does not alter a difference in time between the time-coordinate of the first node and the time-coordinate of the second node; and a common point lies between the first node and the second node as a result of altering the time-coordinate of the first node and altering the time-coordinate of the second node; and program instructions to present a visualization of the process model such that, for each stage of the serial process, a plurality of line segments intersect at the common point.

According to another embodiment of the present disclosure, a computer system is provided. The computer system includes one or more computer processors, one or more computer readable storage media, and program instructions stored on the computer readable storage media for execution by at least one of the one or more processors. The program instructions include program instructions to generate a process model of a serial process, the process model representing each of one or more instances of the serial process as a series of nodes, wherein: the serial process includes a plurality of events; each node is associated with an event of the plurality of events and a time at which the associated event occurred in an instance of the serial process; the serial process includes a plurality of stages; and the program instructions to generate the process model of the serial process comprise: program instructions to, for each stage of the plurality of stages, disassociate a first node from the time at which the associated event occurred by altering a time-coordinate of the first node; and program instructions to, for each stage of the plurality of stages, disassociate a second node from the time at which the associated event occurred by altering a time-coordinate of the second node, and wherein: altering the time-coordinate of the first node and altering the time-coordinate of the second node does not alter a difference in time between the time-coordinate of the first node and the time-coordinate of the second node; and a common point lies between the first node and the second node as a result of altering the time-coordinate of the first node and altering the time-coordinate of the second node; and program instructions to present a visualization of the process model such that, for each stage of the serial process, a plurality of line segments intersect at the common point.

BRIEF DESCRIPTION OF THE DRAWINGS

FIGS. 6B-6D are graphs that depict stage-duration visualizations of the instances of a serial process that are depicted in FIG. 6A, in accordance with respective embodiments of the present disclosure.

DETAILED DESCRIPTION

Data analysis is an important part of applied research and problem solving in industry. The most fundamental data analysis approaches are visualization (e.g., histograms, scatter plots, surface plots, tree maps, parallel coordinate plots), statistics (e.g., hypothesis test, regression, PCA), data mining (e.g., association mining), and machine learning methods (e.g., clustering, classification, decision trees). Among these approaches, information visualization, or visual data analysis, is the most reliant on the cognitive skills of human analysts, and allows the discovery of unstructured actionable insights that are limited only by human imagination and creativity. Information visualization is also a hypothesis generation scheme, which can be, and is typically followed by more analytical or formal analysis, such as statistical hypothesis testing.

To reduce costs, various companies (e.g., mining companies) collect data concerning serial processes. As used herein, a serial process is a process that includes several stages that are performed in order. While various instances of a serial process are expected to behave similarly, there are often variances between instances (e.g., variances in the temporal durations of one or more stages between instances) due, at least in part, to differing process configurations and/or factors/conditions. Companies often employ subject matter experts (SMEs) to analyze the serial process data to identify outliers and extract patterns from the data in order to improve the process by identifying root-causes of deviations from expected behavior. A typical data set, however, often describes dozens, hundreds, or thousands of instances of a serial process. In general, it is difficult for SMEs to extract useful information from such large data sets. In order to help SMEs extract useful information from large data sets, a visualization of a serial process can convey statistical information, such as an average, a standard of deviation. Data sets can also be visualized as control charts and/or box plots. While visualizations of a serial process can incorporate statistical tools to reveal insights about the data being visualized, embodiments of the present disclosure recognize that statistical tools generally result in aggregation of data, which can obscure and/or eliminate other types of information that a visualization would otherwise convey concerning the serial process. Embodiments of the present invention provide visualizations of serial process data sets that eliminate or minimize aggregation of data and from which a subject matter expert can compare temporal aspects of various stages in a large number of instances of a serial process.

Figure 1:
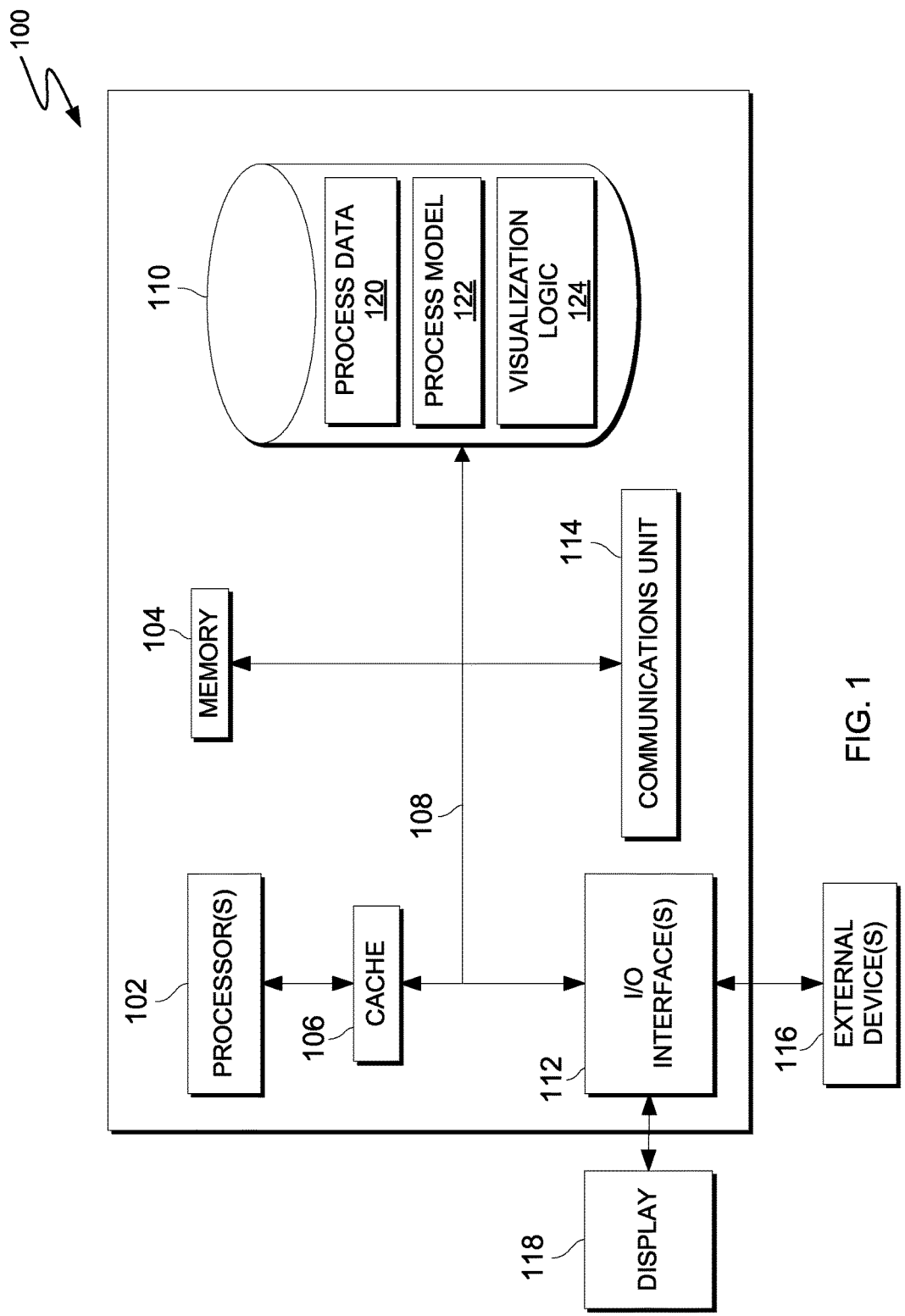
FIG. 1 is a block diagram of a computer system, in accordance with an embodiment of the present disclosure.

The present disclosure will now be described in detail with reference to the Figures. FIG. 1 is a block diagram of a computer system, in accordance with an embodiment of the present disclosure. In various embodiments, computer system 100 is a computing device that can be a standalone device, a server, a laptop computer, a tablet computer, a netbook computer, a personal computer (PC), or a desktop computer. In another embodiment, computer system 100 represents a portion of a computing system utilizing clustered computers and components to act as a single pool of seamless resources. In general, computer system can be any computing device or a combination of devices with access to process data 120 and process model 122, and with access to and/or capable of executing visualization logic 124.

Computer system 100 includes communications fabric 108, which provides communications between computer processor(s) 102, memory 104, persistent storage 110, communications unit 114, and input/output (I/O) interface(s) 112. Communications fabric 108 can be implemented with any architecture designed for passing data and/or control information between processors (such as microprocessors, communications and network processors, etc.), system memory, peripheral devices, and any other hardware components within a system. For example, communications fabric 108 can be implemented with one or more buses.

Memory 104 and persistent storage 110 are computer readable storage media. In various embodiments, memory 104 includes random access memory (RAM). In general, memory 104 can include any suitable volatile or non-volatile computer readable storage media. Cache 106 is a fast memory that enhances the performance of processors 102 by holding recently accessed data and data near accessed data from memory 104.

Program instructions and data can be stored in persistent storage 110 for execution and/or access by one or more of processor(s) 102 via cache 106 and memory 104. In the embodiment depict in FIG. 1, process data 120, process model 122, and visualization logic 124 are in persistent storage 110 of stored computer system 100. In some embodiments, one or more of process data 120, process model 122, and visualization logic 124 can reside on another computing device, provided that processor(s) 102 and/or various other components of computer system 100 can access and are accessible by process data 120, process model 122, and visualization logic 124. In other embodiments, one or more of process data 120, process model 122, and visualization logic 124 is provided locally on persistent storage 110 (e.g., via a disk drive or universal serial bus (USB) port) in the form of removable computer data storage media (e.g., a compact disk (CD), a digital versatile disc (DVD), USB drive, and/or an external hard disk drive). In yet other embodiments, one or more of process data 120, process model 122, and visualization logic 124 can be stored externally and accessed through a communication network. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will enable computer system 100 to have access to process data 120 and process model 122 and execute visualization logic 124, in accordance with various embodiments of the present disclosure. As described herein, processor(s) 102 execute visualization logic 124 to present various visualizations of process data 120 based, at least in part, on process model 122.

Process data 120 is data that describes a serial process (e.g., completion times of various stages for each instance of the serial process). Process data 120 allows for the construction of a statistical model of a serial process. In some embodiments, process data 120 includes data that represents factor(s) that are associated with various instances of the serial process. The factors can include, for example, one of more process characteristics such as the persons, the type of equipment, the type of material, the material weight, or the distances involved in the serial process.

Process model 122 is a model of stages of one or more instances of a serial processes and is based, at least in part, on process data 120. Process model 122 is constructed, at least in part, from process data 120, as described herein with respect to FIG. 2.

Communications unit 114, in these examples, provides for communications with other data processing systems or devices. In these examples, communications unit 114 includes one or more network interface cards. Communications unit 114 may provide communications through the use of either or both physical and wireless communications links. Program instructions and data used to practice embodiments of the present invention may be downloaded to persistent storage 110 through communications unit 114.

I/O interface(s) 112 allows for input and output of data with other devices that may be connected to each computer system. For example, I/O interface 112 may provide a connection to external devices 116 such as a keyboard, keypad, a touch screen, and/or some other suitable input device. External devices 116 can also include portable computer readable storage media such as, for example, thumb drives, portable optical or magnetic disks, and memory cards. Software and data used to practice embodiments of the present invention can be stored on such portable computer readable storage media and can be loaded onto persistent storage 110 via I/O interface(s) 112. I/O interface(s) 112 also connect to a display 118.

Display 118 provides a mechanism to display data to a user and may be, for example, a computer monitor.

It should be appreciated that FIG. 1 provides only an illustration of one implementation and does not imply any limitations with regard to the environments in which different embodiments may be implemented. Many modifications to the depicted environment can be made without departing from the scope of the present disclosure.

Figure 2:
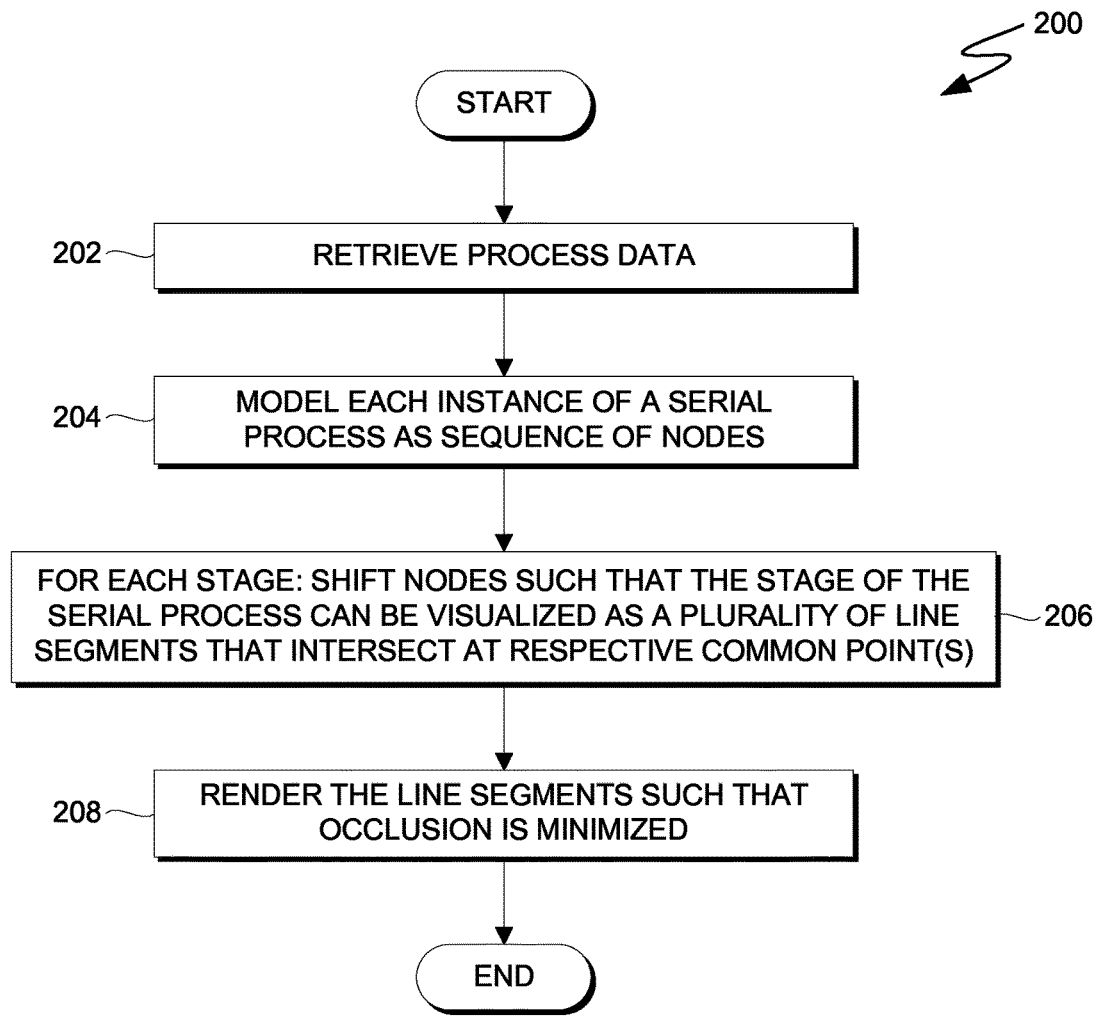
FIG. 2 is a flowchart depicting operations for visualizing a serial process, in accordance with an embodiment of the present disclosure.

FIG. 2 is a flowchart depicting operations of visualization logic 124, in accordance with an embodiment of the present disclosure. For example, FIG. 2 is a flowchart depicting operations 200 of visualization logic 124 as executed on computer system 100. The product of operations 200 is a stage-duration visualization of one or more instances of a serial process.

Figure 3:
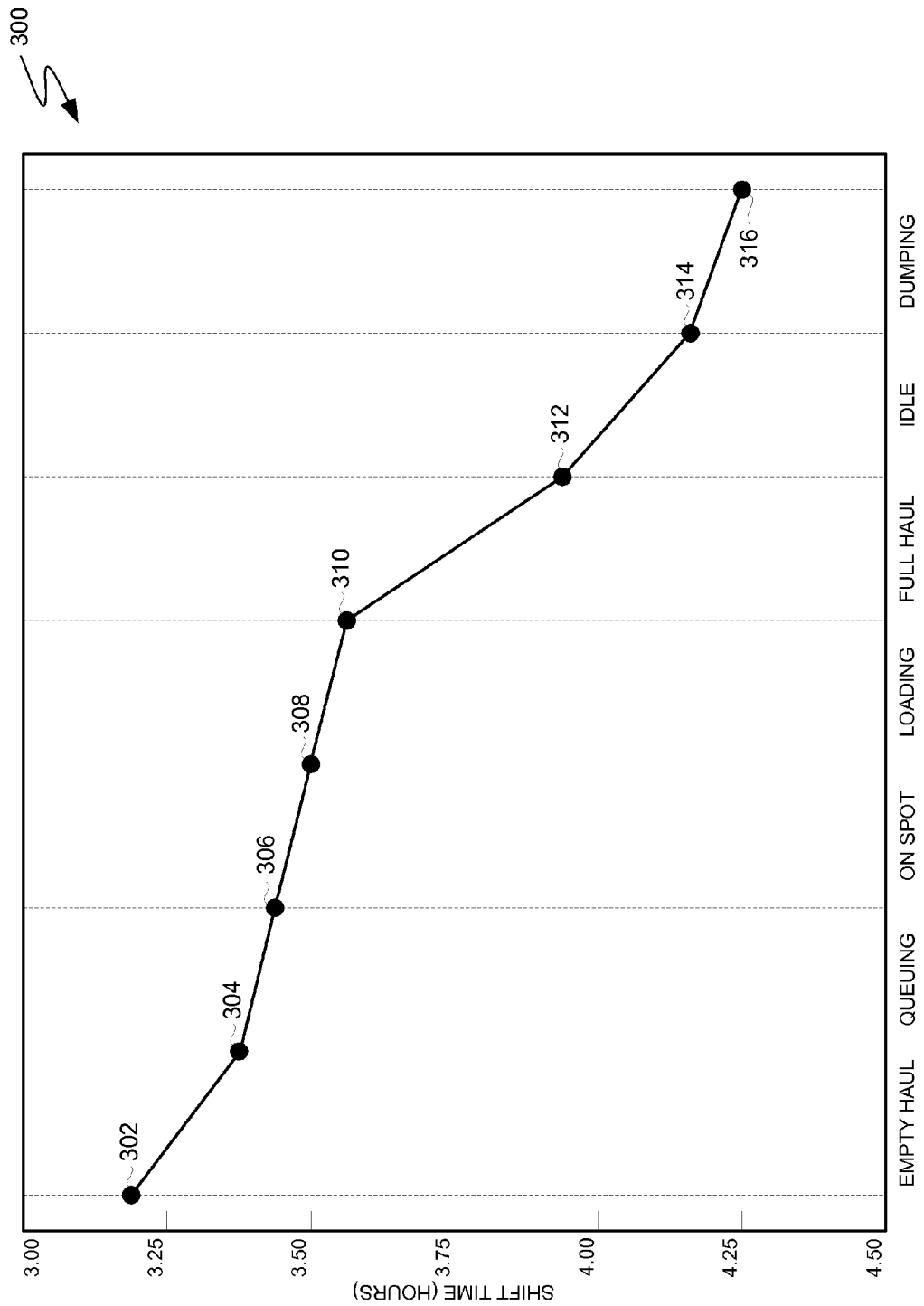
FIG. 3 is graph that depicts a cycle-time visualization of one instance of a serial process, in accordance with an embodiment of the present disclosure.

In operation 202, visualization logic 124 retrieves process data 120 from persistent storage 110. In operation 204, visualization logic 124 generates process model 122 from process data 120. For each instance of the serial process described in process data 120, process model 122 describes the instance as a sequence of nodes that can be used to generate a visualization that depicts the instance as a sequence of linear line segments (i.e., straight line segments). Each node represents a respective event in the instance of the serial process at the time of day at which the event occurred. Accordingly, process model 122 defines a first axis that represents time (i.e., a time-axis) and a second axis that represents the sequence of events that describe the serial process (i.e., and event-axis). In various exemplary embodiments, each node has an x-axis coordinate that corresponds to a particular event/stage and a y-axis coordinate that corresponds to a point in time. FIG. 3 depicts one example of a visualization of process model 122, as described herein. As used herein, a "node" does not imply that the node joins two or more line segments. Instead, a node is any point in the coordinate system that is associated with an event in an instance of the serial process (e.g., a point in a two dimensional or three dimensional Cartesian coordinate system). Some nodes do not join line segments (e.g., nodes 302 and 316, as depicted in FIG. 3). Other nodes can join line segments (e.g., nodes 304, 306, 308, 310, 312, and 314, as depicted in FIG. 3). In some embodiments, process model 122 includes multiple instances of nodes that describe the end of one stage in an instance of the serial process and the beginning of the next stage in the instance of the serial process. In such embodiments, process model 122 associates each of the stages with a respective instance of the joining node. In other embodiments, process model 122 associates multiple stages of an instance of a serial process with a single instance of the joining node in operation 204. When instructed to generate visualizations like those depicted in FIGS. 6, 8, and 9 (i.e., when performing operation 206), visualization logic 124 updates process model 122 by, at least in part, generating an additional instance of the joining node and associating each of the multiple stages with a respective instance of the joining node. Stated differently, operation 204 is analogous to, for each instance of the serial process, "disconnecting" the line segments that represent the instance of the serial process such that each line segment of the instance can be shifted independently of other line segments of the instance. In yet other embodiments, each stage of an instance of the serial process is modeled as a sequence of vectors that originate from nodes that indicate the beginning of the respective stages. Persons of ordinary skill in the art will understand that operations 200 can be applied, with appropriate modifications, to embodiments of the present invention that model each instance of the serial process as a sequence of vectors. In general, process models 122 can be used to generate a cycle-time visualization of the serial process following operation 204. Cycle-time visualizations are discussed with respect to FIGS. 3 and 4.

For each stage of the serial process, visualization logic 124 shifts the nodes of respective instances of the serial process (operation 206). Visualization logic 124 shifts the nodes such that each stage of the serial process can be visually depicted as one or more pluralities of line segments; and for each plurality of line segments, the line segments intersect at a common point, each line segment representing one instance of the serial process. For example, FIG. 5B depicts a single plurality of line segments in each stage of the serial process and FIG. 6B depicts multiple pluralities of line segments in each stage of the serial process. For each stage of the serial process, nodes can be shifted in a first direction or a second direction in relation to the time-axis coordinate of a respective common point (i.e., the common point that a specific pair of nodes is shifted with respect to). Persons of ordinary skill in the art will understand that shifting the nodes is this way eliminates any associations between the nodes and a particular time of day (i.e., the time of day at which the event that corresponds to the node occurred). Instead, time is relative to other nodes and/or one or more other points in the coordinate system that are defined by process model 122 (e.g., the time-axis coordinate of a respective common point). In some embodiments, however, some nodes are not shifted with respect to the time-axis coordinates of respective common points (e.g., for one or more stages, process model 122 includes a common point that lies along a linear line between two static nodes, and at least some of the other nodes that are associated with the stage are shifted relative to the static nodes). For each pair of nodes, visualization logic 124 preserves the distance between the time-axis coordinates of the nodes in each pair of nodes order to preserve the duration of the stage in the respective instance of the serial process. In some embodiments, a first coordinate (i.e., an event-coordinate) of the common point is the midpoint between the events that define the stage (e.g., the midpoint between events along the x-axis). In other embodiments, the first coordinate of the common point is a point other than the midpoint between the events that define the stage.

In some embodiments, the time-coordinates of the common points are normalized (i.e., brought into alignment) such that a first plurality of instances of the serial process are associated with a first set of normalized common points and a second plurality of instances of serial process are associated with a second set of normalized common points. In these embodiments, the first set and the second set of normalized common points each include one common point for each stage of the serial process. Normalizing the common points in this manner can be advantageous when the first plurality of instances and the second plurality of instances respectively represent a first cycle of multiple actors through the serial process and a second cycle of the actors through the serial process. An example of such an embodiment is discussed with respect to FIG. 6C. In other embodiments, the time-coordinates of the common points are normalized (i.e., brought into alignment) such that all instances of the serial process share a set of normalized common points. An example of such an embodiment is discussed with respect to FIG. 6D. In yet other embodiments, the common points of related stages (i.e., stages associated with the same instances of the serial process) are not normalized. Instead, common point(s) are selected, for each stage of the serial process, such that each common point lies on straight line(s) connecting a pair of static nodes (or intersects a vector originating from a static node) such that a visualization of this embodiment preserves the duration of one or more instances of the serial process. An example of such an embodiment is discussed with respect to FIG. 6B. Stated differently, shifting the nodes in such embodiments is analogous to normalizing (i.e., bringing into alignment) line segments within each stage, as opposed to normalizing common points between stages. The line segments are normalized such that one or more pluralities of line segments intersect at respective common points that lie on respective, static line segments, the static line segments depicting one or more instances of the serial process such that the duration of the instance(s) can be at least estimated from the time-axis of a visualization of the serial process.

For each stage of the serial process, visualization logic 124 renders linear line segments (i.e., straight line segments) between the nodes of respective instances of the serial process to generate a stage-duration visualization of the serial process (operation 208). In other embodiments, visualization logic 124 renders lines that trace vectors that originate from respective nodes to generate a stage-duration visualization of the serial process. In general, occlusion due to overplotting of line segments will occur to various degrees. It is advantageous to render the line segments such that occlusion is minimized as much as possible. Minimizing occlusion can enable a subject matter expert to more easily identify patterns with respect to the durations of the stages of the various instances of the serial process using a purely visual approach. In some embodiments, visualization logic 124 renders at least some line segments as tapered line segments. As used herein, a tapered line segment has a stroke width that is widest near the ends of the line segment and tapers towards the point at which the line segment intersects a common point (e.g., the center of the line segment). In some embodiments, a tapered line segment has a width as thin as zero at the common point. In addition to, or as an alternative to, rendering tapered line segments, visualization logic 124 can render line segments that have transparency. In various embodiments, the transparency of a line segment can vary along the length of the line segment, with the highest transparency at the point where the line segment intersect a common point, and/or different line segments can be rendered with different levels of transparency. The transparency of one or more line segments can be determined based on the density distribution of the data that is to be presented on the display.

Figure 4:
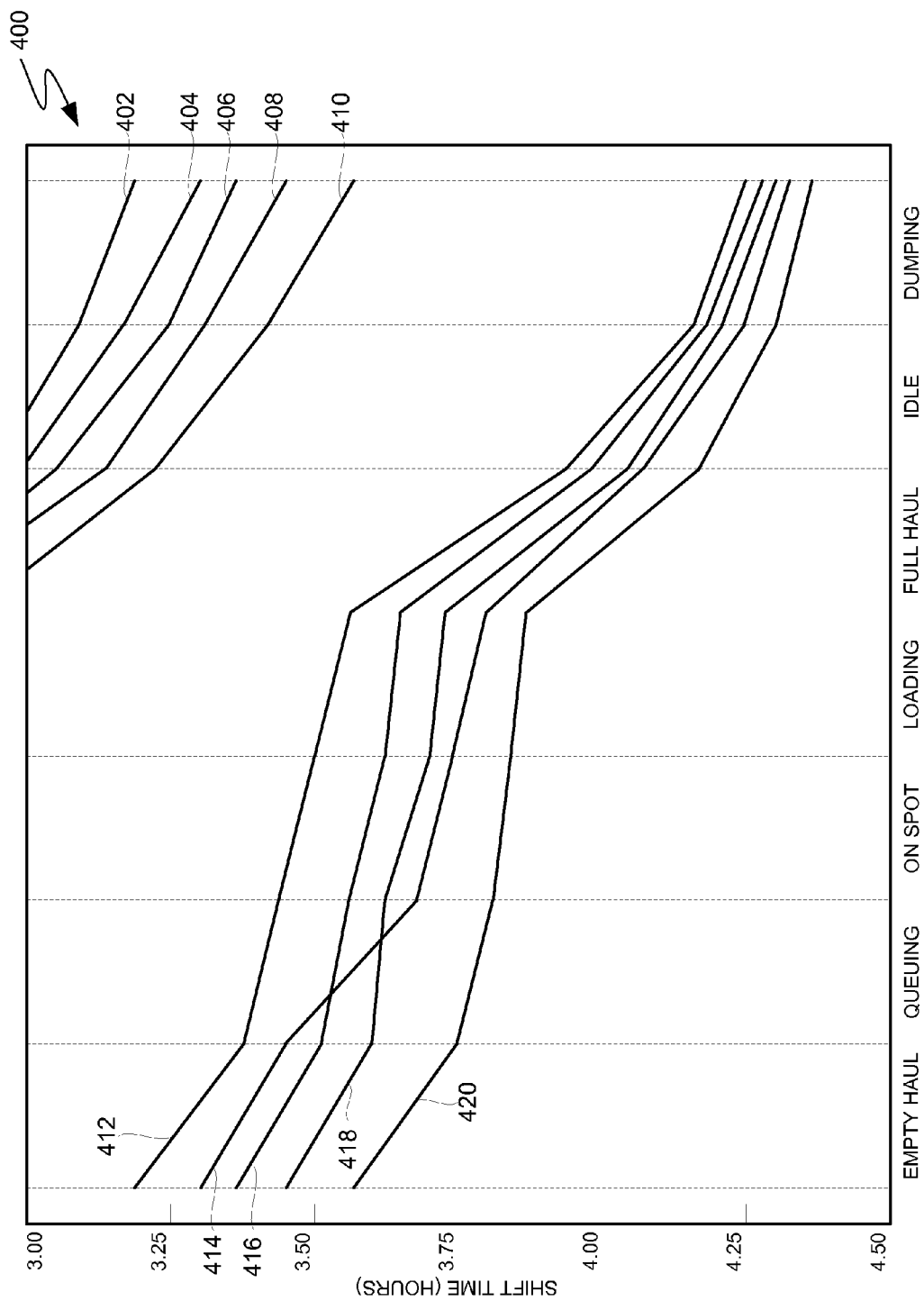
FIG. 4 is graph that depicts a cycle-time visualization of multiple instances of a serial process, in accordance with an embodiment of the present disclosure.

FIGS. 3 and 4 depict various instances of a serial process that are visualized with respect to the actual times at which events of the serial process occurred (i.e., cycle-time visualizations). Stated differently, FIGS. 3 and 4 depict visualizations of various instances of a serial process prior shifting nodes such that line segments associated with the stages intersect at respective common points, as described with respect to FIG. 2 (i.e., FIGS. 3 and 4 depict visualizations of respective examples of process model 122 prior to operation 206). FIGS. 3 and 4 are included in the present disclosure in order to do explain the relationship between various nodes and various line segments in relation to a specific example of a serial process that is visualized according to operations 200 in FIGS. 5B and FIGS. 6B-6D. FIGS. 3 and 4 do not represent results of operations 200.

FIG. 3 is a graph that depicts a visualization of one instance of a serial process, in accordance with an embodiment of the present disclosure. Specifically, FIG. 3 depicts cycle-time visualization 300, which is an example of one instance of a serial hauling process. A cycle-time visualization, as depicted in FIG. 3, includes the various stages of a serial process, in order of performance, along the x-axis and units of time along the y-axis. In the embodiment depicted in FIG. 3, duration of the shift represented by the y-axis increases from top to bottom. Other coordinate systems, however, can be used. In general, each stage in the serial process is defined by a first event (i.e., the start of the stage) and a second event (i.e., the end of the stage). To generate the cycle-time visualization, nodes are plotted for each instance of the serial process. Each node represents an event and the time at which the event occurred. The nodes of each instance of the serial process are connected, in order of performance, to visualize the instance of the serial process as a curve in the cycle-time visualization.

In FIG. 3, for example, cycle-time visualization 300 depicts one instance of a serial loading-hauling process (i.e., the progress of a single hauling truck) as a series of interconnected node/events. In this example, node 302 represents the beginning of an empty haul (e.g., the end of dumping excavated material during a previous instance or the beginning of a new cycle) and node 304 represents the arrival of the truck in the loading area, where it waits in queue. The line segment connecting nodes 302 and 304 represents an empty-hauling stage. Node 306 represents the arrival of the truck at the loading spot, and the line segment connecting nodes 304 and 306 represents a queuing stage. Node 308 represents the time that loading of the truck begins, and the line segment connecting nodes 306 and 308 represents an on-spot stage. Node 310 represents the time that loading of the truck ends, and the line segment connecting nodes 308 and 310 represents a loading stage. Node 312 represents the arrival of the truck at a dumping location, and the line segment connecting nodes 310 and 312 represents a full-hauling stage. Node 314 represents the time that dumping begins, and the line segment connecting nodes 312 and 314 represents an idle stage when the trucks waits to dump its load. Node 316 represents the time that dumping ends, and the line segment connecting nodes 314 and 316 represents a dumping stage. In some cases, the time that dumping ends is also the start of an empty-hauling stage for another instance of the serial process (i.e., the truck beings a new hauling cycle). For each stage of an instance of a serial process, the duration of a stage is reflected in the difference in y-axis coordinates of the nodes that define the stages.

FIG. 4 is a visualization of a cluster of instances of a serial process, in accordance with an embodiment of the present disclosure. Specifically, cycle-time visualization 400 visualizes the hauling cycles (i.e., iterations of a serial hauling process) of several trucks that are working concurrently. For example, curves 402 and 412 respectively describe the work of a first truck in a first and second cycle, curves 404 and 414 respectively describe the work of a second truck in a first and second cycle, curves 406 and 416 respectively describe the work of a third truck in a first and second cycle, curves 408 and 418 respectively describe the work of a fourth truck in a first and second cycle, and curves 410 and 420 respectively describe the work of a fifth truck in a first and second cycle. As depicted by each pair of curves, one iteration of the hauling cycle ends and a subsequent iteration of the hauling cycle begins when a truck reaches the end of the dumping stage. In some embodiments, instances of serial processes tend to cluster when a "working rhythm" is reached. A working rhythm is a situation in which the time interval between the same events and/or stages in multiple instances of a serial process approximates a regular value (i.e., a low variance exists). Visualizations like cycle-time visualization 400 are useful for detecting deviations from a working rhythm. In FIG. 4, for example, curves 414, 416, and 418 depict a cross-process in which the second truck begins the queuing stage before the third and fourth trucks but does not begin the on-spot stage until after the third and fourth trucks. This cross-process causes a temporary breakdown of the working rhythm (i.e., the working rhythm is re-established in subsequent stages).

Figure 5A:
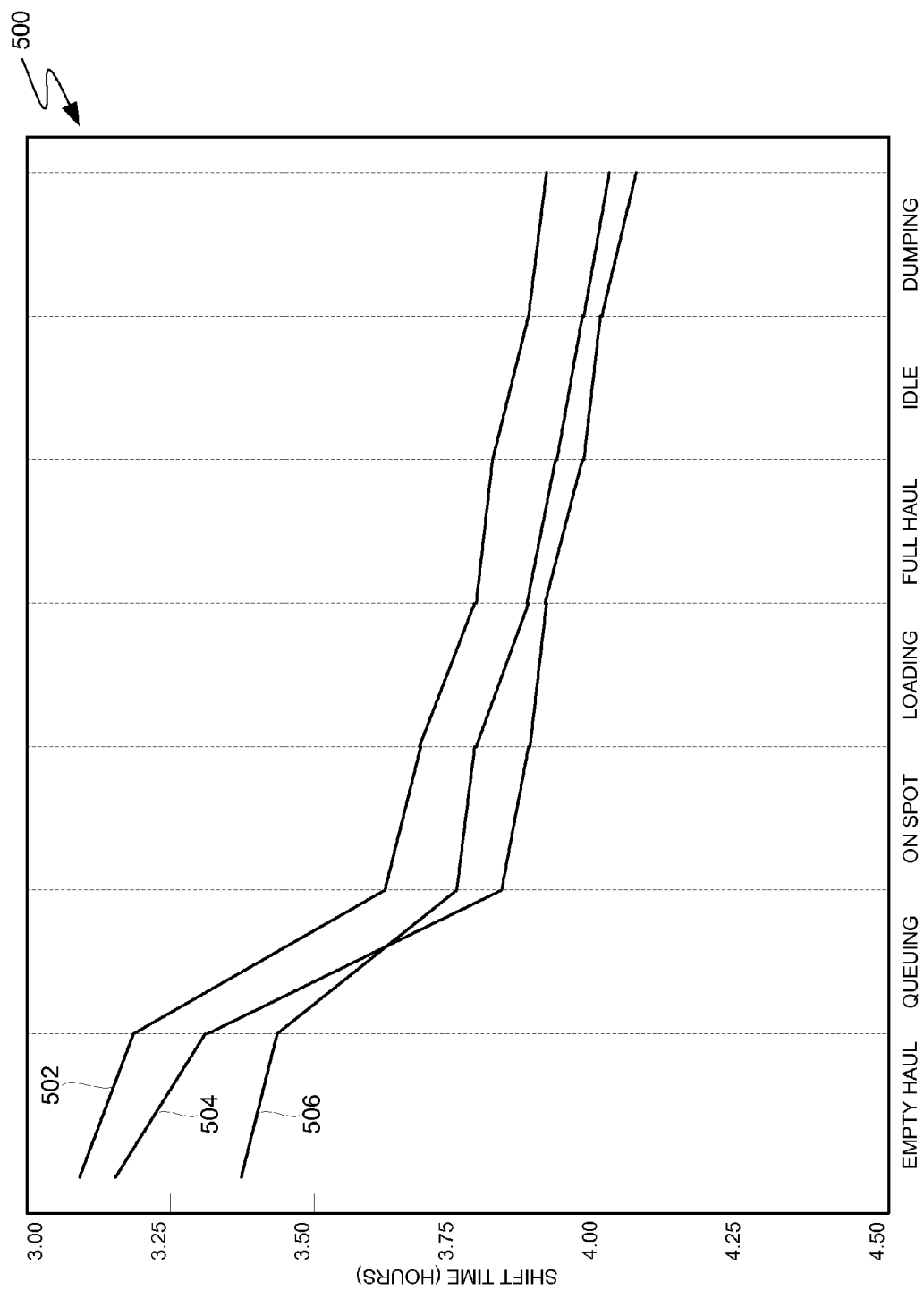
FIGS. 5A is a graph that depicts a cycle-time visualization of various instances of a serial process, in accordance with an embodiment of the present disclosure.
Figure 5B:
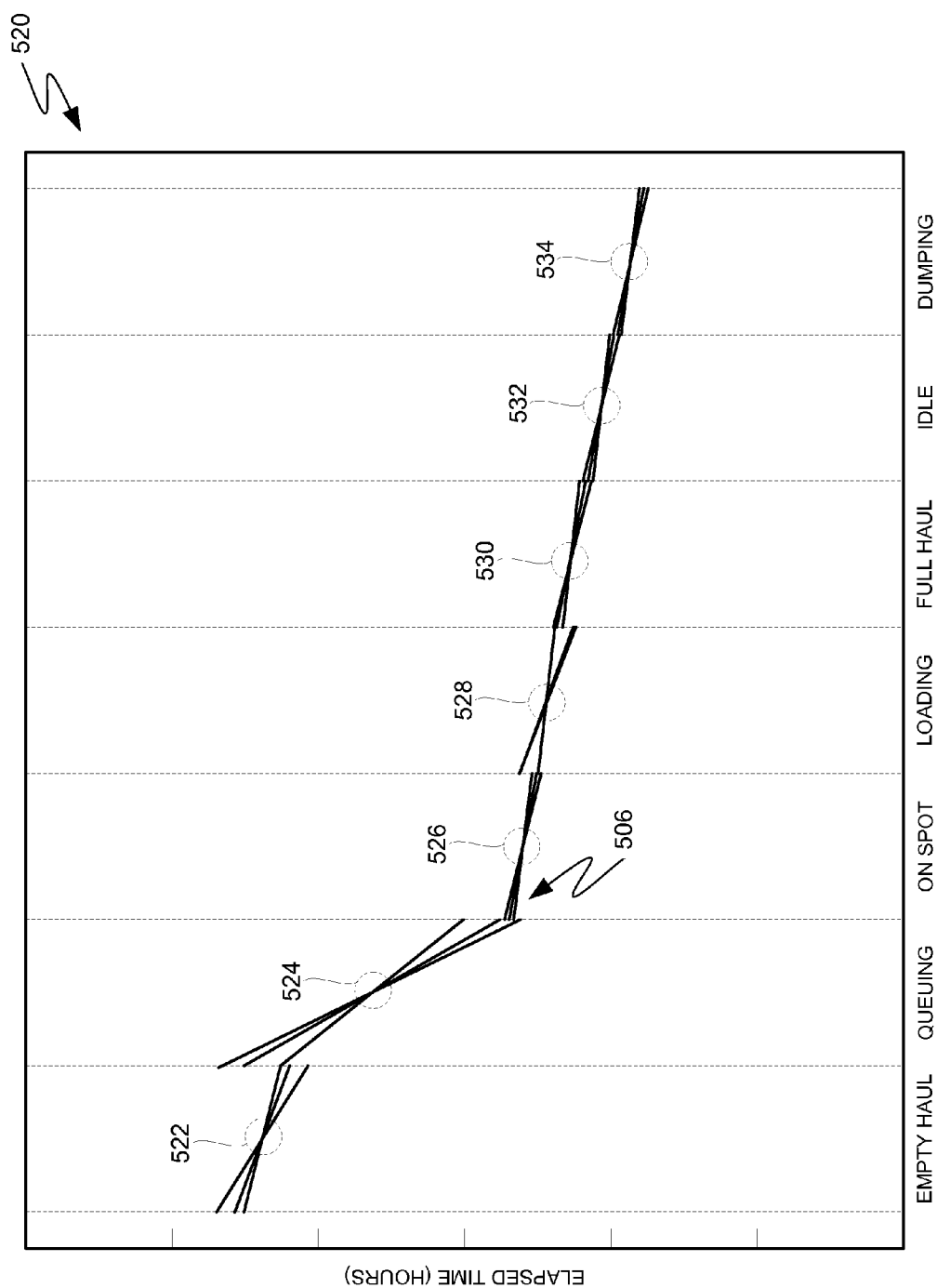
FIG. 5B is a graph that depicts a stage-duration visualization of the instances of a serial process that are depicted in FIG. 5A, in accordance with an embodiment of the present disclosure.

FIGS. 5A is a graph that depicts a cycle-time visualization of various instances of a serial process, in accordance with an embodiment of the present disclosure. FIG. 5B is a graph that depicts a stage-duration visualization of the instances of a serial process that are depicted in FIG. 5A, in accordance with an embodiment of the present disclosure. The serial process depicted in FIGS. 5A and 5B is the same serial process that is described with respect to FIGS. 3 and 4. More specifically, FIG. 5A depicts cycle-time visualization 500 and FIG. 5B depicts stage-duration visualization 520. In FIG. 5A, curve 502 depicts operations of a first truck, curve 504 depicts operations of a second truck, and curve 506 depicts operations of a third truck. When applied to the process data that was used to generate FIG. 5A, operations 200 generate stage-duration visualization 520. In comparing FIGS. 5A and 5B, a person of ordinary skill in the art will understand that generating stage-duration visualization 520 is analogous to dividing each of curves 502, 504, and 506 into line segments that represent each stage of the serial process, disconnecting the line segments, and shifting the line segments within each stage of the serial process such that line segments within each stage intersect at a common point. For example: line segments representing the duration of the "empty haul" stage for the first, second, and third trucks intersect at common point 522; line segments representing the duration of the "queuing" stage for the first, second, and third trucks intersect at common point 524; line segments representing the duration of the "on spot" stage for the first, second, and third trucks intersect at common point 526; line segments representing the duration of the "loading" stage for the first, second, and third trucks intersect at common point 528; line segments representing the duration of the "full haul" stage for the first, second, and third trucks intersect at common point 530; line segments representing the duration of the "idle" stage for the first, second, and third trucks intersect at common point 532; and line segments representing the duration of the "dumping stage" stage for the first, second, and third trucks intersect at common point 534.

Stage-duration visualization 520 is an example of an embodiment in which the time-coordinates of the common points are not normalized (i.e., brought into alignment). Instead, nodes associated with curves 502 and 504 were shifted downward to create common points 522, 524, 526, 528, 530, 532, and 534 along curve 506. Stated differently, within each stage, shifted nodes/line segments are normalized with respect two static nodes/line segments instead of the time-coordinate of common point(s). While the y-axis of stage-duration visualization 520 is incremented in hours, as in FIG. 5A, the increment labels (e.g., "4.00," "3.75," and "3.50") are absent, and the y-axis is labeled "Elapsed Time" instead of "Shift Time" to indicate that, in each stage of the serial process, time is relative to the beginning and end of each stage. Accordingly, stage-duration visualization 520 can reveal insights concerning the duration of each stage in various instances of the serial process. In addition, the duration of at least one instance of the serial process is preserved in embodiments like the one depicted in FIG. 5B. Because the nodes associated with curve 506 are static in this example, the duration of the instance associated with curve 506 can be determined by finding the difference between the time-coordinates of the nodes associated with the beginning of the "Empty Haul" stage and the end of the "Dumping" stage or estimated by visually analyzing stage-duration visualization 520.

While not depicted in FIG. 5B for illustrative simplicity, the techniques discussed with respect to FIG. 2 for reducing occlusion can be applied to the stage-duration visualization depicted in FIG. 5B.

Figure 6A:
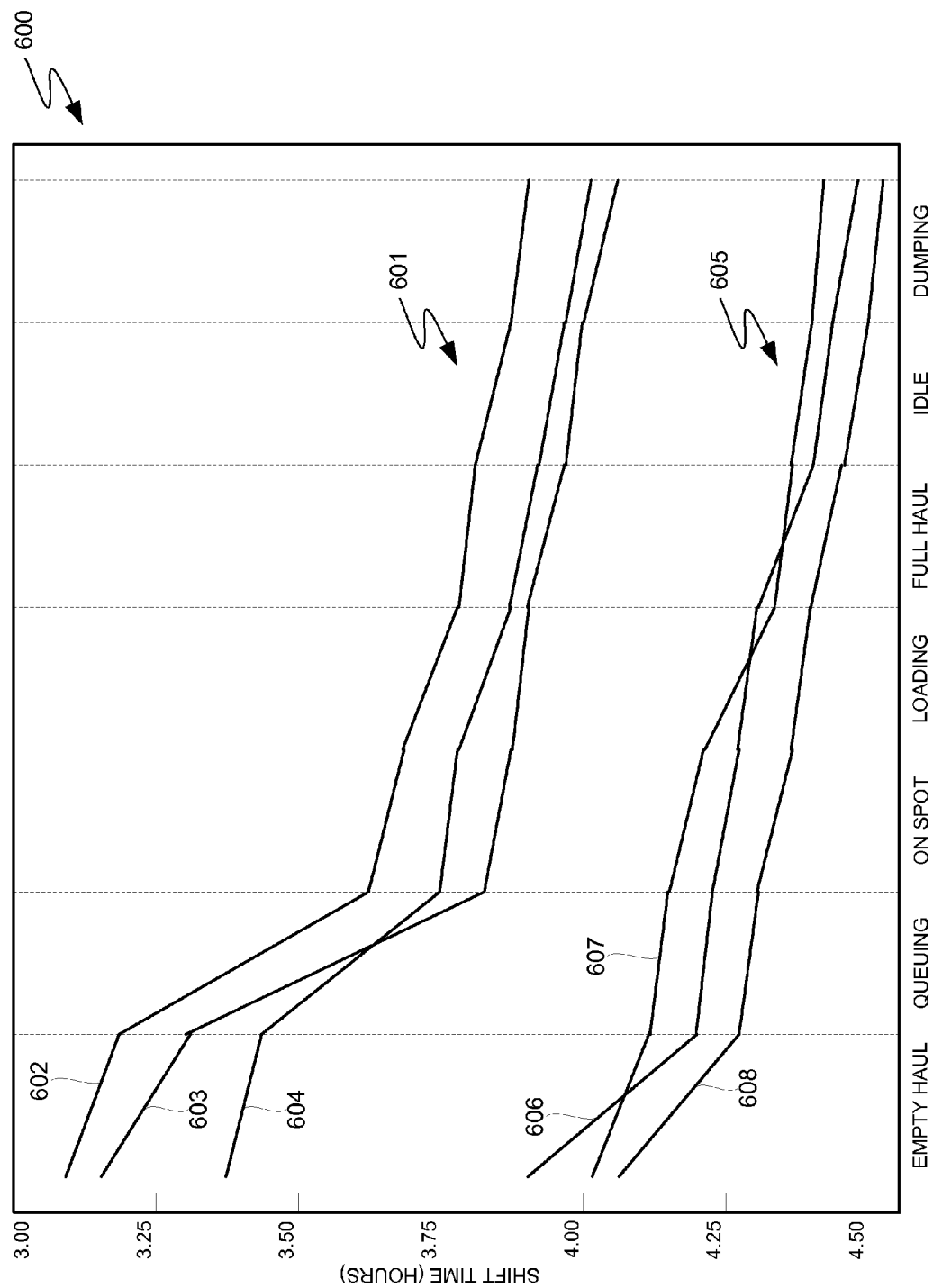
FIG. 6A is a graph that depicts a cycle-time visualization of various instances of a serial process, in accordance with an embodiment of the present disclosure.
Figure 6B:
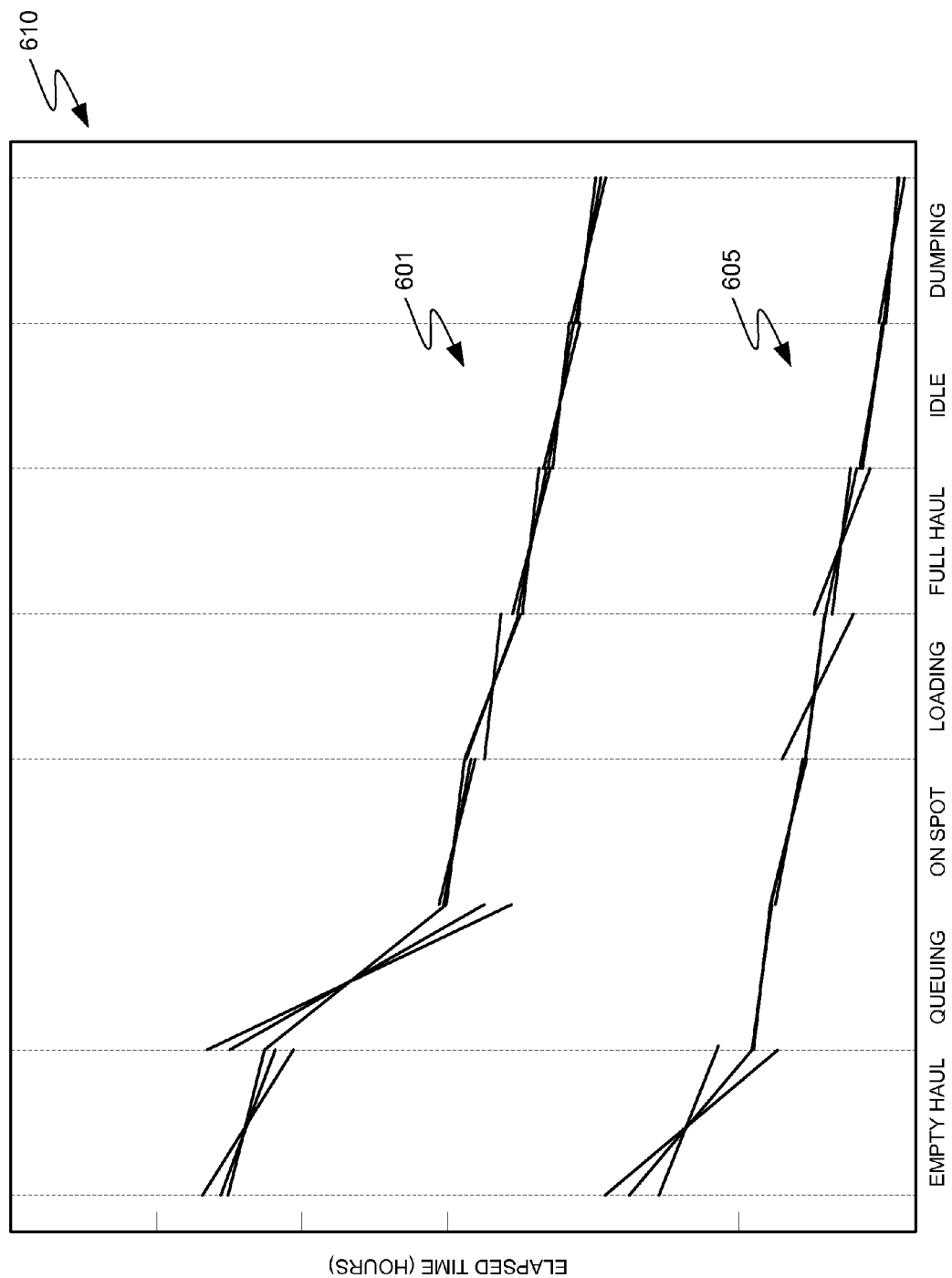
Figure 6C:
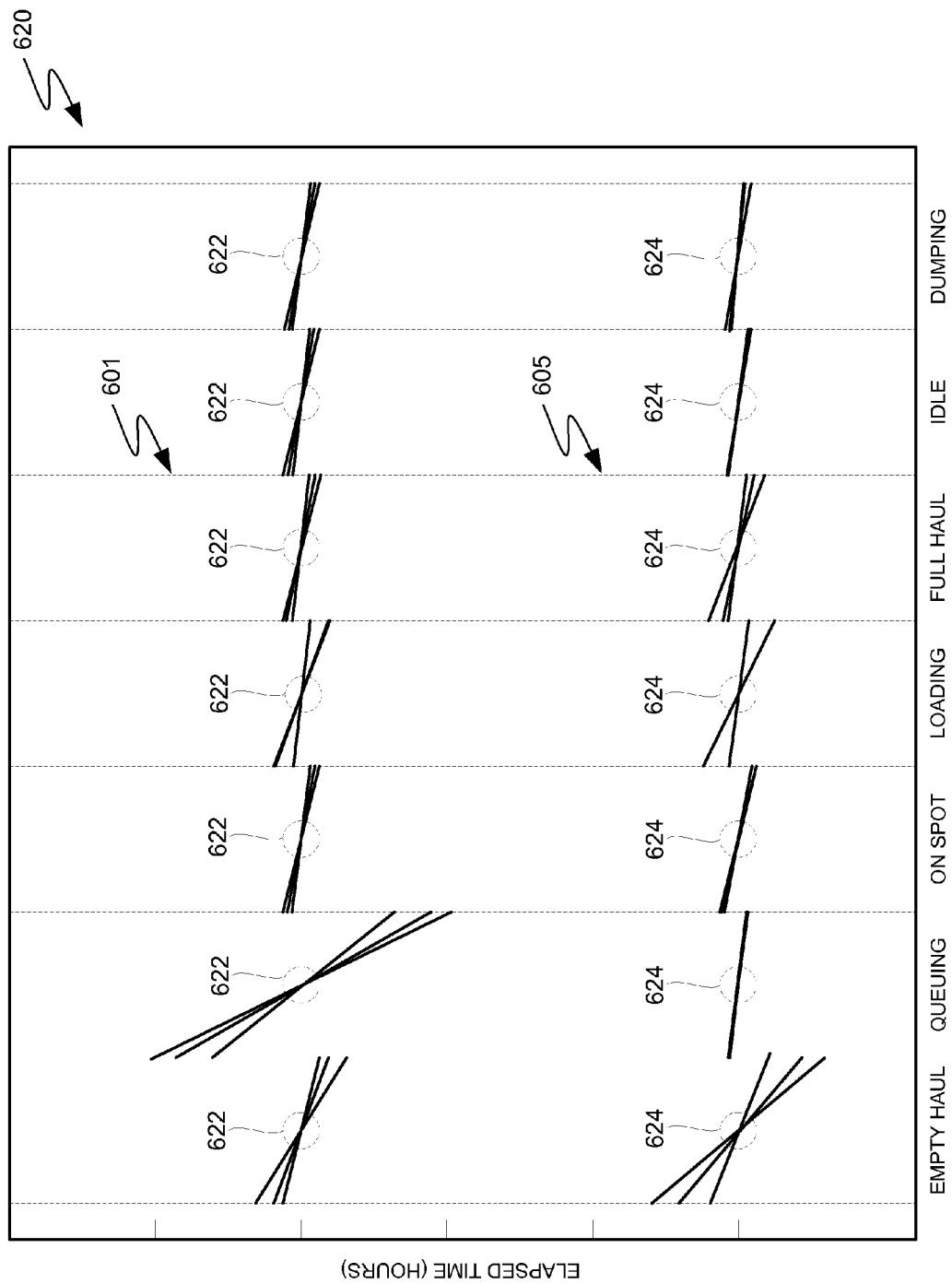

FIG. 6A is a graph that depicts a cycle-time visualization of various instances of a serial process, in accordance with an embodiment of the present disclosure. FIGS. 6B, 6C, and 6D are graphs that depict stage-duration visualizations of the instances of a serial process that are depicted in FIG. 6A, in accordance with respective embodiments of the present disclosure. When applied to the process data that was used to generate FIG. 6A, operations 200 generate stage-duration visualizations 610, 620, or 630 depending on how visualization logic 124 is configured, as described with respect to FIG. 2. In each of the embodiments respectively depicted in stage-duration visualization 610, 620, and 630, all instances of the serial process depicted in cycle-time visualization 600 remain present, and therefore, aggregation is advantageously avoided. In addition, switching visual contexts between cycle-time visualization 600 and stage-duration visualizations 610, 620, and 630 can reveal, via a purely visual approach, trends in process data 120 and make stage-duration comparable within and between stages of the serial process.

More specifically, FIG. 6A depicts cycle-time visualization 600, which includes curves 601 and curves 605. Curves 601 represent a first cycle of a group of trucks (i.e., a first, second, and third truck) through the serial process (i.e., each curve of curves 601 represents operations of one of the trucks). Curves 601 include curve 602, curve 603, and curve 604. Curves 605 represent a second cycle of the group of trucks through the serial process. Curves 605 include curve 606, curve 607, and curve 608. FIGS. 6B, 6C, and 6D respectively depict stage-duration visualizations 610, 620, and 630.

As depicted in FIG. 6B, stage-duration visualization 610 is an example of an embodiment in which visualization logic 124 is configured to select common point(s), for each stage of the serial process, such that each common point lies on straight line(s) connecting a pair of static nodes (or intersects a vector originating from a static node) and such that a visualization generated via operations 200 preserves the duration of one or more instances of the serial process. More specifically, the line segments of curves 602 and 603 are normalized with respect to the line segments of curve 604 such that the duration of the instance of the serial process that is associated with curve 604 can be estimated visually from stage-duration visualization 610. Similarly, the line segments of curves 606 and 607 are normalized with respect to the line segments of curve 608 such that the duration of the instance of the serial process that is associated with curve 608 can be estimated visually from stage-duration visualization 610.

As depicted in FIG. 6C, stage-duration visualization 620 is an example of an embodiment in which visualization logic 124 is configured to normalize (i.e., bring into alignment) the time-coordinates of the common points such that a first plurality of instances of the serial process are associated with a first set of normalized common points and a second plurality of instances of serial process are associated with a second set of normalized common points. In FIG. 6C, for example, curves 601 are associated with normalized common points 622 and curves 605 are associated with normalized common points 624. Stage-duration visualization 620 enables a subject matter expert to, for each cycle of the serial process, compare the duration of the stages for the respective instances of the serial process.

In contrast, stage-duration visualization 630 is an example of an embodiment in which visualization logic 124 is configured to normalize (i.e., bring into alignment) the time-coordinates of the common points such that all instances of the serial process share a single set of normalized common points. In FIG. 6D, for example, curves 601 and curves 605 are associated with normalized common points 632. Stage-duration visualization 630 enables a subject matter expert to, for two or more cycles of the serial process, compare the duration of the various stages. In some embodiments, stage-duration visualization 630 can, for every instances of the serial process described by process model 122, compare the duration of the various stages.

While not depicted in FIGS. 6B, 6C, and 6D for illustrative simplicity, the techniques discussed with respect to FIG. 2 for reducing occlusion can be applied to the stage-duration visualization depicted in FIGS. 6B, 6C, and 6D. In addition, a group of related instances of the serial process (e.g., curves 601 and 605) can be color coded or associated with various stroke patterns to distinguish them from other groups of related instances of the serial process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The term(s) "Smalltalk" and the like may be subject to trademark rights in various jurisdictions throughout the world and are used here only in reference to the products or services properly denominated by the marks to the extent that such trademark rights may exist.

As used herein, a list of alternatives such as "at least one of A, B, and C" should be interpreted to mean "at least one A, at least one B, at least one C, or any combination of A, B, and C."

The term "exemplary" means of or relating to an example and should not be construed to indicate that any particular embodiment is preferred relative to any other embodiment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for utilizing visual data analysis to identify outliers and extract patterns from large data sets to improve serial processes by identifying root-causes of deviations from expected behavior, the method comprising:
   generating, by one or more computer processors, a process model of a serial process, the process model representing each of one or more instances of the serial process as a series of nodes, wherein:
   the serial process includes a plurality of events;
   each node is associated with an event of the plurality of events and a time at which the associated event occurred in an instance of the serial process;
   the serial process includes a plurality of stages;
   generating the process model of the serial process comprises:
      for each stage of the plurality of stages, disassociating, by one or more computer processors, a first node from the time at which the associated event occurred by altering a time-coordinate of the first node;
      for each stage of the plurality of stages, disassociating, by one or more computer processors, a second node from the time at which the associated event occurred by altering a time-coordinate of the second node, and wherein:
         altering the time-coordinate of the first node and altering the time-coordinate of the second node does not alter a difference in time between the time-coordinate of the first node and the time-coordinate of the second node; and
         a common point lies between the first node and the second node as a result of altering the time-coordinate of the first node and altering the time-coordinate of the second node;
      normalizing, by one or more computer processors, a first plurality of common points such that a first group of instances of the serial process are associated with the first plurality of common points;
      normalizing, by one or more computer processors, a second plurality of common points such that a second group of instances of the serial process are associated with the second plurality of common points; and
      wherein each stage of the serial process is associated with a respective common point of the first plurality of common points and a respective common point of the second plurality of common points; and
   presenting, by one or more computer processors, a cycle-time visualization of the process model such that, for each stage of the serial process, a plurality of line segments intersect at the common points and from which deviations from a working rhythm can be detected via visual data analysis and root-cause analysis of large data sets.

2. The method of claim 1, wherein presenting, by one or more computer processors, the visualization of the process model such that, for each stage of the serial process, a plurality of line segments intersect at the common point comprises:

rendering, by one or more computer processors, a line segment of the plurality of line segments such that, a stroke width of the line segment is narrowest where the line segment intersects the common point and the stroke width increases from where the line segment intersects the common point toward a first send of the line segment and a second end of the line segment.

3. The method of claim 1, wherein presenting, by one or more computer processors, the visualization of the process model such that, for each stage of the serial process, a plurality of line segments intersect at the common point comprises:

rendering, by one or more computer processors, a line segment of the plurality of line segments such that the line segment is translucent.

4. The method of claim 3, wherein a transparency of the line segment is highest where the line segment intersects the common point in order to reduce occlusion, and wherein the transparency of the line segment decreases from where the line segment intersects the common point toward a first end of the line segment and a second end of the line segment.

5. The method of claim 1, wherein generating the process model of the serial process further comprises:

normalizing, by one or more computer processors, a plurality of common points such that all instances of the serial process are associated with the plurality of common points, wherein each stage of the serial process is associated with a respective common point of the plurality of common points.

6. The method of claim 1, wherein the serial process is a serial loading-hauling process representing actions of one or more trucks and comprising an empty hauling stage, a queuing stage, an on spot stage, a loading stage, a full haul stage, an idle stage, and a dumping stage.

7. A computer program product for utilizing visual data analysis to identify outliers and extract patterns from large data sets to improve serial processes by identifying root-causes of deviations from expected behavior, the computer program product comprising:

a computer readable storage memory and program instructions stored on the computer readable storage memory, the program instructions comprising:

program instructions to generate a process model of a serial process, the process model representing each of one or more instances of the serial process as a series of nodes, wherein:

the serial process includes a plurality of events;
each node is associated with an event of the plurality of events and a time at which the associated event occurred in an instance of the serial process;
the serial process includes a plurality of stages;
the program instructions to generate the process model of the serial process comprise:

program instructions to, for each stage of the plurality of stages, disassociate a first node from the time at which the associated event occurred by altering a time-coordinate of the first node;
program instructions to, for each stage of the plurality of stages, disassociate a second node from the time at which the associated event occurred by altering a time-coordinate of the second node, and wherein:

altering the time-coordinate of the first node and altering the time-coordinate of the second node does not alter a difference in time between the time-coordinate of the first node and the time-coordinate of the second node; and
a common point lies between the first node and the second node as a result of altering the time-coordinate of the first node and altering the time-coordinate of the second node;

program instructions to normalize a first plurality of common points such that a first group of instances of the serial process are associated with the first plurality of common points;
program instructions to normalize a second plurality of common points such that a second group of instances of the serial process are associated with the second plurality of common points; and
wherein each stage of the serial process is associated with a respective common point of the first plurality of common points and a respective common point of the second plurality of common points; and program instructions to present a cycle-time visualization of the process model such that, for each stage of the serial process, a plurality of line segments intersect at the common points and from which deviations from a working rhythm can be detected via visual data analysis and root-cause analysis of large data sets.

8. The computer program product of claim 7, wherein the program instructions to present the visualization of the process model such that, for each stage of the serial process, a plurality of line segments intersect at the common point comprise:

program instructions to render a line segment of the plurality of line segments such that, a stroke width of the line segment is narrowest where the line segment intersects the common point and the stroke width increases from where the line segment intersects the common point toward a first send of the line segment and a second end of the line segment.

9. The computer program product of claim 7, wherein the program instructions to present the visualization of the process model such that, for each stage of the serial process, a plurality of line segments intersect at the common point comprise:

program instructions to render a line segment of the plurality of line segments such that the line segment is translucent.

10. The computer program product of claim 9, wherein a transparency of the line segment is highest where the line segment intersects the common point in order to reduce occlusion, and wherein the transparency of the line segment decreases from where the line segment intersects the common point toward a first end of the line segment and a second end of the line segment.

11. The computer program product of claim 7, wherein the program instructions to generate the process model of the serial process further comprise:

program instructions to normalize a plurality of common points such that all instances of the serial process are associated with the plurality of common points, wherein each stage of the serial process is associated with a respective common point of the plurality of common points.

12. The computer program product of claim 7, wherein the serial process is a serial loading-hauling process representing actions of one or more trucks and comprising an empty hauling stage, a queuing stage, an on spot stage, a loading stage, a full haul stage, an idle stage, and a dumping stage.

13. A computer system for utilizing visual data analysis to identify outliers and extract patterns from large data sets to improve serial processes by identifying root-causes of deviations from expected behavior, the computer system comprising:
one or more computer processors;
one or more computer readable storage memories;
program instructions stored on the computer readable storage memories for execution by at least one of the one or more processors, the program instructions comprising:
program instructions to generate a process model of a serial process, the process model representing each of one or more instances of the serial process as a series of nodes, wherein:
the serial process includes a plurality of events;
each node is associated with an event of the plurality of events and a time at which the associated event occurred in an instance of the serial process;
the serial process includes a plurality of stages;
the program instructions to generate the process model of the serial process comprise:
program instructions to, for each stage of the plurality of stages, disassociate a first node from the time at which the associated event occurred by altering a time-coordinate of the first node;
program instructions to, for each stage of the plurality of stages, disassociate a second node from the time at which the associated event occurred by altering a time-coordinate of the second node, and wherein:
altering the time-coordinate of the first node and altering the time-coordinate of the second node does not alter a difference in time between the time-coordinate of the first node and the time-coordinate of the second node; and
a common point lies between the first node and the second node as a result of altering the time-coordinate of the first node and altering the time-coordinate of the second node;
program instructions to normalize a first plurality of common points such that a first group of instances of the serial process are associated with the first plurality of common points;
program instructions to normalize a second plurality of common points such that a second group of instances of the serial process are associated with the second plurality of common points; and
wherein each stage of the serial process is associated with a respective common point of the first plurality of common points and a respective common point of the second plurality of common points; and
program instructions to present a cycle-time visualization of the process model such that, for each stage of the serial process, a plurality of line segments intersect at the common points and from which deviations from a working rhythm can be detected via visual data analysis and root-cause analysis of large data sets.

14. The computer system of claim 13, wherein the program instructions to present the visualization of the process model such that, for each stage of the serial process, a plurality of line segments intersect at the common point comprise:
program instructions to render a line segment of the plurality of line segments such that, a stroke width of the line segment is narrowest where the line segment intersects the common point and the stroke width increases from where the line segment intersects the common point toward a first send of the line segment and a second end of the line segment.

15. The computer system of claim 13, wherein the program instructions to present the visualization of the process model such that, for each stage of the serial process, a plurality of line segments intersect at the common point comprise:
program instructions to render a line segment of the plurality of line segments such that the line segment is translucent.

16. The computer system of claim 15, wherein a transparency of the line segment is highest where the line segment intersects the common point in order to reduce occlusion, and wherein the transparency of the line segment decreases from where the line segment intersects the common point toward a first end of the line segment and a second end of the line segment.

17. The computer system of claim 13, wherein the program instructions to generate the process model of the serial process further comprise:
program instructions to normalize a plurality of common points such that all instances of the serial process are associated with the plurality of common points, wherein each stage of the serial process is associated with a respective common point of the plurality of common points.

18. The computer system of claim 13, wherein the serial process is a serial loading-hauling process representing actions of one or more trucks and comprising an empty hauling stage, a queuing stage, an on spot stage, a loading stage, a full haul stage, an idle stage, and a dumping stage.

* * * * *